US006954454B1

(12) United States Patent
Schuster et al.

(10) Patent No.: US 6,954,454 B1
(45) Date of Patent: Oct. 11, 2005

(54) ARCHITECTURE FOR A CENTRAL OFFICE USING IP TECHNOLOGY

(75) Inventors: Guido M. Schuster, Des Plaines, IL (US); Ikhlaq S. Sidhu, Vernon Hills, IL (US); Jerry J. Mahler, Prospect Heights, IL (US); David Grabelsky, Skokie, IL (US); Jacek A. Grabiec, Chicago, IL (US); Thomas J. Kostas, Evanston, IL (US); Michael S. Borella, Naperville, IL (US)

(73) Assignee: UT Starcom, Inc., Alameda, CA (US)

( * ) Notice: Subject to any disclaimer, the term of this patent is extended or adjusted under 35 U.S.C. 154(b) by 0 days.

(21) Appl. No.: 09/303,514

(22) Filed: May 3, 1999

(51) Int. Cl.[7] ............................................. H04L 12/66
(52) U.S. Cl. ..................................... 370/352; 370/356
(58) Field of Search ............................. 370/351, 352, 370/313, 354, 355, 356, 400, 401, 465, 466, 370/467, 389, 493; 379/88.17

(56) References Cited

U.S. PATENT DOCUMENTS

| | | | | |
|---|---|---|---|---|
| 6,069,890 A | * | 5/2000 | White et al. ................. | 370/352 |
| 6,134,235 A | * | 10/2000 | Goldman et al. ........... | 370/352 |
| 6,243,377 B1 | * | 6/2001 | Phillips et al. .............. | 370/354 |
| 6,292,479 B1 | * | 9/2001 | Bartholomew et al. ..... | 370/352 |
| 6,292,553 B1 | * | 9/2001 | Fellingham et al. ... | 379/221.02 |
| 6,426,961 B1 | * | 7/2002 | Nimmagadda .............. | 370/493 |
| 6,650,619 B1 | * | 11/2003 | Schuster et al. ............ | 370/230 |
| 2002/0024945 A1 | * | 2/2002 | Civanlar et al. ............ | 370/352 |

OTHER PUBLICATIONS

P. Tom Taylor, Internet Engineering Task Force, Internet Draft, "Requirements for a Telephony Gateway Device Control Protocol," <draft-taylor-ipdc-reqts-00.txt>, Sep. 1998, pp. 1-22.

P. Tom Taylor, Pat R. Calhoun, Allan C. Rubens, Internet Engineering Task Force, Internet Draft, "Base Protocol," <draft-taylor-ipdc-00.txt>, Jul. 1998, pp. 1-78.

Mauricio Arango, Christian Huitema, Internet Engineering Task Force, Internet Draft, "Simple Gateway Control Protocol (SGCP)," <draft-huitema-sgcp-v1-02.txt>, Jul. 30, 1998, pp. 1-82.

Mauricio Arango, Andrew Dugan, Isaac Elliott, Christian Huitema, Scott Pickett, Internet Engineering Task Force, Internet Draft, "Media Gateway Control Protocol (MGCP)," <draft-huitema-megaco-mgcp-v0r1-05.txt>, pp. 1-120.

(Continued)

*Primary Examiner*—Ajit Patel
(74) *Attorney, Agent, or Firm*—McDonnell Boehnen Hulbert & Berghoff LLP

(57) ABSTRACT

A telephony system and method having a switch for analog voice and data signals that is connected to a first network, and a router for routing Internet Protocol packets that is connected to a second network using Internet Protocol addressing. The telephony system and method also includes a telephony gateway that is connected to both the switch and the router for converting analog voice signals into Internet Protocol packets and for converting Internet Protocol packets into analog voice signals, the telephony gateway being connected, and a remote access server that is connected to both the switch and the router for converting analog data signals into Internet Protocol packets and for converting Internet Protocol packets into analog data signals. The switch may have a switch matrix capable of being connected to the Public Switched Telephone Network, a line rack with a plurality of line cards connected to the switch matrix, and a trunk rack with a plurality of trunk cards connected to the switch matrix. The switch matrix may also be connected to the telephony gateway and the remote access server.

49 Claims, 4 Drawing Sheets

OTHER PUBLICATIONS

Isaac K. Elliott, Internet Engineering Task Force, Internet Draft, "Media Control Protocol," <draft-elliott-ipdc-media-00.txt>, Aug. 1998, pp. 1-43.

Andrew Dugan, Internet Engineering Task Force, Internet Draft, "Connection Control Protocol," <draft-dugan-ipdc-connection-00.txt>, Aug. 1998, pp. 1-28.

Bob Bell, Internet Engineering Task Force, Internet Draft, "Device Management Protocol," <draft-bell-ipdc-signaling-00.txt>, Aug. 1998, pp. 1-17.

Information Sciences Institute, Internet Engineering Task Force ("IETF"), Request for Comments ("RFC") RFC-791 "Internet Protocol," Sep. 1981, pp. 1-45.

Information Sciences Institute, Internet Engineering Task Force ("IETF"), Request for Comments ("RFC") RFC-793, "Transmission Control Protocol", Sep. 1981, pp. 1-85.

International Telecommunication Union (ITU-T), Recommendation H.323, "Packet Based Multimedia Communications Systems," Sep. 1997, pp. 1-119.

H. Schulzrinne, A. Rao, R. Lanphier, Internet Engineering Task Force ("IETF"), Request for Comments ("RFC") RFC-2326, "Real Time Streaming Protocol (RTSP)," Apr. 1998, pp. 1-92.

H. Schulzrinne, S. Casner, R. Frederick, V. Jacobson, Internet Engineering Task Force ("IETF"), Request for Comments (RFC) RFC-1889, "RTP: A Transport Protocol for Real-Time Applications," Jan. 1996, pp. 1-75.

M. Handley, H. Schulzrinne, E. Schooler, J. Rosenberg, Internet Engineering Task Force ("IETF") Request for Comments 2543, "SIP: Session Initiation Protocol," Mar. 1999, pp. 1-153.

T.J. Kostas, M.S. Borella, I. Sidhu, G.M. Schuster, J. Mahler, J. Grabiec, "Real-time voice overpacket-switched networks, " *IEEE Network*, vol. 12, No. 1, pp. 18-27, Jan./Feb. 1998.

U. Schoen, J. Hamann, A. Jugel, H. Kurzawa, C. Schmidt, "Convergence between public switching and the Internet," *IEEE Communications*, vol. XX, No. 1, Jan. 1998.

* cited by examiner

ARCHITECTURE FOR A CENTRAL OFFICE
USING IP TECHNOLOGY

FIELD OF INVENTION

This invention relates to architectures for telephone networks. More specifically, it relates to an architecture for a central office ("CO") using Internet Protocol ("IP") technology.

BACKGROUND OF THE INVENTION

The telephone CO is a primary component of the communication infrastructure. It is the interconnection point for dedicated access lines and shared network resources (i.e., to and from local residences and businesses) with long distance phone carriers and data network providers. A typical CO will serve between 10,000 and 50,000 customers in the local area immediately surrounding the CO. In large metropolitan areas, the customer base may be as large as 100,000 and, in a few instances, upwards of 200,000 subscribers. Each CO is usually owned and operated by an Incumbent Local Exchange Carrier ("ILEC"), but a Competitive Local Exchange Carrier ("CLEC"), such as an Inter-exchange Carrier ("IXC"), may have access to and be responsible for a significant portion of the CO.

The current telephony infrastructure relies primarily on circuit switching. It is also based upon the following assumptions: (1) bandwidth is a scarce resource; (2) computation is a scarce resource; and (3) terminal devices are simple with limited capabilities in order to provide network security. Under these assumptions, the telephony network needs to manage the bandwidth and computational burden carefully, and intelligence needs to reside inside of the network. Many telecommunications experts, however, have recognized that these assumptions are no longer valid, and have set forth the following new set of assumptions for the communication infrastructure: (1) bandwidth is plentiful and cheap; (2) computation is plentiful and cheap; and (3) terminal devices are "intelligent," yet capable of providing the necessary security for networks. Under these new assumptions, the main job of the network is to deliver messages between two points and little else, the prime example of which is the Internet.

Considering current trends and looking into the future, it is likely before long most communications will be packet-switched, rather than circuit-switched, and controlled largely from edge devices. One of the main driving forces for this change is the ease of adding new features on the edge instead of inside of the network. With a network that delivers packets under the direction of edge nodes using a simple interface, any reasonably talented programmer could write an application that can communicate with any other application on this network. This will free an incredible amount of creative energy to develop new applications for multi-media, as well as voice. On the other hand, the current telephony network is centrally administered using a protocol for out-of-band control and signaling, known as signaling system 7 ("SS7") (see, e.g., T.

Russell, *Signaling System #7* (2d. Ed.), McGraw-Hill, 1998). SS7 is a closed system, not accessible to, or directly modifiable by, users. It is doubtful that SS7 will be able to adapt to the rich set of features imaginable in an IP-based telephony network, and even if it can be adapted to some of these features, it is unlikely to change quickly enough to realize them.

There is a very strong movement amongst both data and circuit-based networking companies to support IP telephony, or voice over IP ("VoIP"). For instance, some data companies are developing VoIP gateways and gatekeepers, while local and long distance telephony companies are planning on offering VoIP services to residential and commercial customers. The business models in place exploit the cheaper cost of IP hardware and software compared to legacy telephony equipment. In other words, the current driving force of VoIP is the lower cost of the transport medium and switching equipment. IP-based telephony systems, however, can also sound much better than the legacy telephony system and offer many more features. In the end, these features may be a greater source of revenue than the reduced marginal cost of IP equipment.

For example, the current low sound quality of the legacy telephony system is tightly coupled with its Time Division Multiplex ("TDM") structure. The system samples voice 8,000 times per second, and each sample is represented by 8 bits. This results in the 64 kilobits per second circuits that dominate the current infrastructure. However, this sampling frequency is just one point on the trade-off curve between required data rate and fidelity. Using the well-known sampling theorem, the highest frequency that can be represented with 8,000 samples per second is 4 kHz. Since the human voice can create sounds up to 10 kHz and the human ear can perceive sounds up to 20 kHz, the 4 kHz bandwidth provided by the telephony system is rather small. In other words, as long as the legacy telephone system is used, the full potential of voice quality will never be reached. In contrast, an IP-based telephony system is by no means constrained to 8,000 samples per second. Accordingly, using high-fidelity handsets, CD-quality conversations can easily be supported by IP-based telephony in the near future.

Since the edge nodes of an IP telephony network will support the rapid deployment of new features, it is conceivable that several new enhancements will be made in the areas of voice and multi-media. For example, the IP-based telephony system may facilitate the following voice enhancements: (1) advanced session initiation, such as multi-party calls using bandwidth-efficient IP multicast and automatic party-finding services; (2) simpler computer-telephony integration ("CTI"), such as call centers with web-based, click-to-dial interfaces; (3) advanced emergency functionality, such as the ability to trade off the number of active calls versus voice quality per call, and prioritize emergency systems (i.e., 911) calls using IP differential or integrated services; (4) a distributed signaling architecture that is more reliable, redundant, modular, and inexpensive (i.e., low cost of entry); (5) integrated media such as voice, video, fax, pagers, web, E-mail, and voicemail accessible via a common addressing mechanism and configuration via a common interface; (6) sophisticated and programmable call processing at client devices (i.e., "smart phones"); and (7) end-user encryption and authentication.

Although, in the long run, IP-based telephony may completely replace circuit-switched telephony, in the short run, the legacy telephony system and the IP-based telephony system will most likely co-exist. Hence, the legacy telephony system and the IP-based telephony system need to be able to inter-operate. Accordingly, it is desirable to provide an architecture and design for an IP-based central office ("IPCO") that provides a framework for supporting both the legacy circuit-switched telephony system and an IP-based telephony system. It is also desirable to provide an IPCO that leverages existing data networking standards and equipment whenever possible, so that only minimal changes to existing networking technologies are necessary in order to achieve the desired functionality.

SUMMARY OF THE INVENTION

The present invention provides a telephony system and method for an IPCO. The telephony system of the present invention comprises a switch for analog signals that is connected to a first network and a router for routing Internet Protocol packets that is connected to a second network using Internet Protocol addressing. The telephony system also comprises a telephony gateway for converting analog signals into Internet Protocol packets and for converting Internet Protocol packets into analog signals. The telephony gateway is connected to both the switch and the router.

The present invention also provides a telephony system comprising a switch for analog signals that is connected to a first network and a router for routing Internet Protocol packets that is connected to a second network using Internet Protocol addressing. The telephony system also comprises a remote access server for converting analog signals into Internet Protocol packets and for converting Internet Protocol packets into analog signals. The remote access server is connected to both the switch and the router.

In addition, the present invention provides a switch for a telephony system comprising a switch matrix capable of being connected to the Public Switched Telephone Network, a line rack with a plurality of line cards connected to the switch matrix, and a trunk rack with a plurality of trunk cards connected to the switch matrix. The switch also comprises a telephony gateway connected to the switch matrix for converting analog voice signals into Internet Protocol packets and for converting Internet Protocol packets into analog voice signals.

Moreover, the present invention provides a method of transferring information within a telephony system comprising the steps of sending an analog signal to a switch connected to a first network, sending the analog signal from the switch to one of a telephony gateway and a remote access server connected to the switch, and converting the analog signal into an Internet Protocol packet at one of the telephony gateway and the remote access server. The method further comprises the step of sending the Internet Protocol packet from one of the telephony gateway and the remote access server to a router connected to one of the telephony gateway and the remote access server. Additionally, the method comprises the step of routing the Internet Protocol packet from the router to a second network using Internet Protocol addressing connected to the router.

Furthermore, the present invention provides a method of transferring information within a telephony system comprising the steps of sending an Internet Protocol packet from a first network using Internet Protocol addressing to a router connected to the first network, and sending the Internet Protocol packet from the router to one of a telephony gateway and a remote access server connected to the router. The method also comprises the step of converting the Internet Protocol packet to an analog signal at one of the telephony gateway and the remote access server. In addition, the method comprises the steps of sending the analog signal from one of the telephony gateway and the remote access server to a switch connected to the one of the telephony gateway and the remote access server, and sending an analog signal from the switch to a second network connected to the switch.

The present invention also provides a method of transferring information within a telephony system comprising the step of sending an Internet Protocol packet from a first network using Internet Protocol addressing to a router connected to the first network and a switch connected to a second network. The method further comprises the step of routing the Internet Protocol packet from the router to a third network using Internet Protocol addressing connected to the router.

DETAILED DESCRIPTION OF AN ILLUSTRATIVE EMBODIMENT

Figure 1:
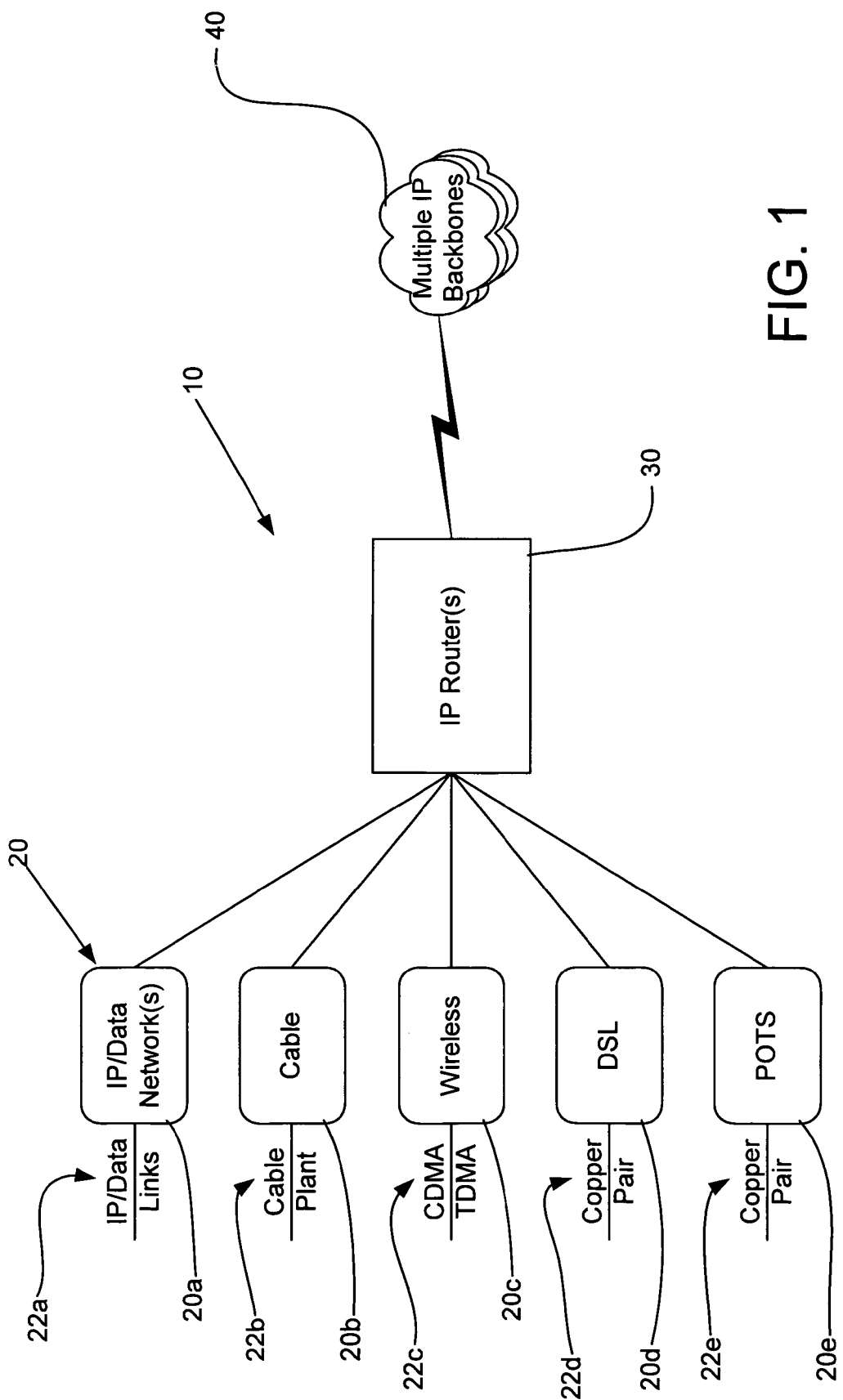
FIG. 1 is a block diagram illustrating a general architecture for an IPCO of the present invention.

FIG. 1 is a block diagram illustrating a general architecture for an IPCO 10 of the present invention. This IPCO 10 provides the core for the architectures of the IPCOs shown in FIGS. 2 and 4, and described in detail below. As shown in FIG. 1, the IPCO 10 comprises a plurality of physical media 20 that includes media for one or more IP/data networks 20a, such as IP/data links 22a, media for cable 20b, such as cable plant 22b, media for wireless telephony 20c, such as transmission technology 22c like Code Division Multiple Access ("CDMA") or Time Division Multiple Access ("TDMA"), media for DSL 20d, such as copper wire pairs 22d, and media for POTS 20e, such as copper wire pairs 22e. The physical media 20 is connected, either directly or indirectly through one or more devices, to one or more IP routers 30, which route packets from/to the physical media 20 to/from one or more IP backbones 40. The IP backbones 40 may include a number of different networks, such as an IP data network or an IP voice network, for a number of different providers. For more information on IP, see Internet Engineering Task Force ("IETF") Request For Comments ("RFC") RFC-791, specifically incorporated herein by reference. As discussed in more detail below, the physical media 20 and/or the IP routers 30 may also be connected to one or more CO switches and/or tandem switches to provide access to the Public Switched Telephone Network ("PSTN").

Figure 2:
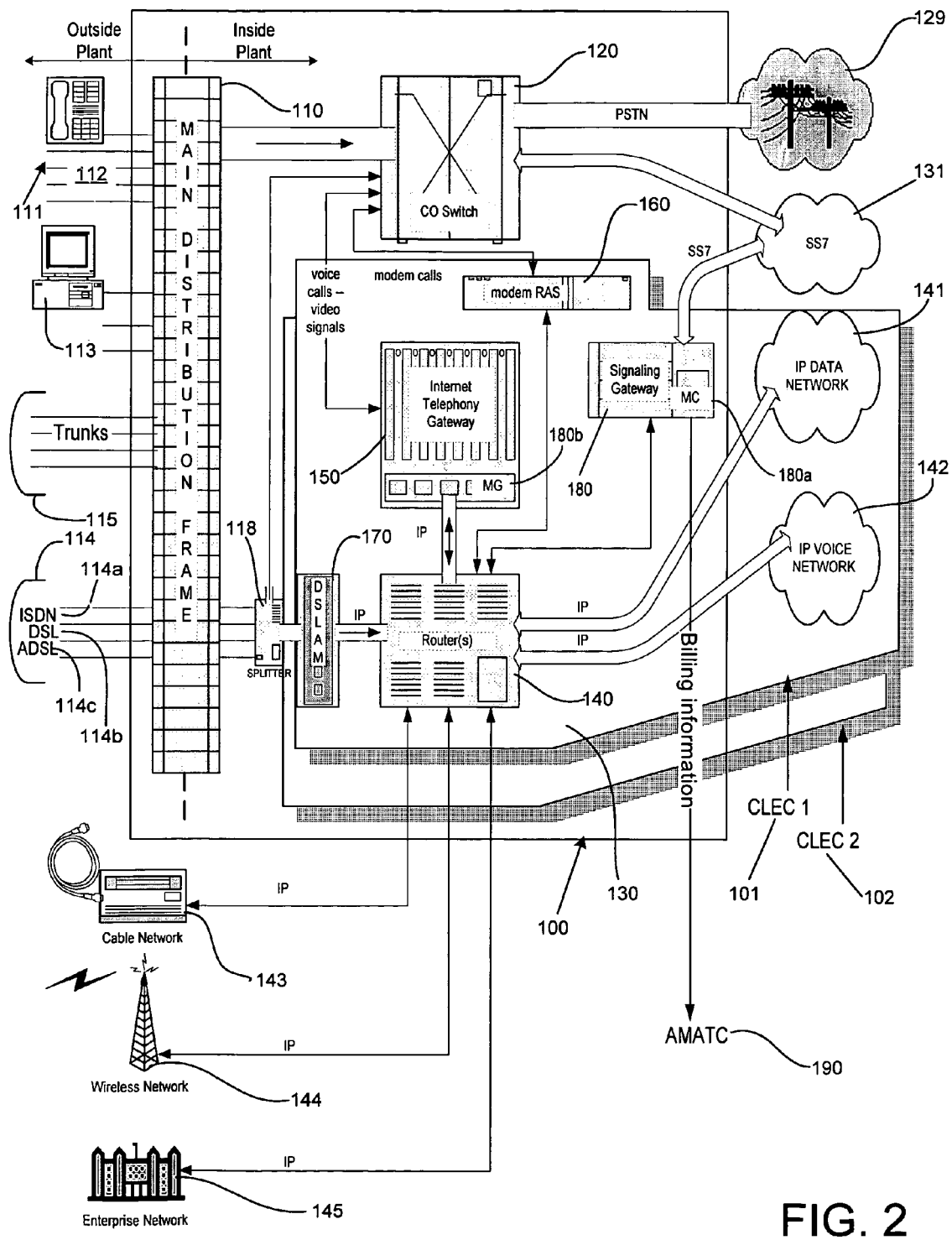
FIG. 2 is a block diagram illustrating an architecture for a CLEC centric IPCO of the present invention.

FIG. 2 shows a CLEC centric IPCO 100 of the present invention that implements the general architecture of the IPCO 10 shown in FIG. 1. As shown in FIG. 2, the IPCO 100 comprises a Main Distribution Frame ("MDF") 110, a CO switch 120, and an IP telephony system 130. The IP telephony system comprises an IP router 140, an Internet Telephony Gateway ("ITG") 150, a modem Remote Access Server ("RAS") 160, a Digital Subscriber Line Access Multiplexer ("DSLAM") 170, and a Signaling Gateway ("SG") 180. Each of these components of the IP telephony system 130 may be rack-mounted for purposes of compactness, simplicity, and portability. Also, while the MDF 110 and the CO switch 120 is preferably provided, controlled, and operated, either directly or indirectly, by an ILEC, the IP telephony system 130, including the IP router 140, the IGT 150, the modem RAS 160, the DSLAM 170, and the SG 180, is preferably provided, controlled, and operated, either directly or indirectly, by one or more CLECs 101, 102. At least one of the CLECs 101, 102 is preferably, but not necessarily, an IXC.

The MDF 110 provides primary lightning protection, i.e., the reduction of the lightning strike voltage to a 2000V metallic transient. As shown in FIG. 1, the MDF 110 also provides the demarcation point between media external to the IPCO 100, known as outside plant, and media within the IPCO 100, known as inside plant. The outside plant may be either copper wire or optical fibers. Preferably, the outside plant copper wires range in size from 20 to 26 gauge and are bundled in 50 to 150 pair cables. The inside plant preferably includes 26 gauge copper wires that are bundled in 25 pair cables.

The MDF 110 is preferably connected directly to the CO switch 120 and the IP telephony system 130 through the inside plant. Although not shown, the MDF 110 may alternatively be indirectly connected to the CO switch 120 through one or more Intermediate Distribution Frames ("IDFs") and/or Digital Cross-connect Systems ("DCS"). In addition, outside plant composed of optical fibers may be connected to the CO switch 120 and/or the IP telephony system 130 through a Fiber Distribution Frame ("FDF") (not shown), instead of the MDF 110.

As shown in FIG. 1, several types of circuits may be connected to the MDF 110. These circuit types include lines 111, such as analog Plain Old Telephone Service ("POTS") lines 112, modem lines 113, and broadband service lines 114, and trunks 115. The lines 111 are dedicated facilities to customers' telephone or public coin-operated phones. When a line 111 becomes active (i.e., off hook), the customer is immediately known, at least in the case of residential telephony. The general topology for lines 111 is that of a hub and spoke, where the IPCO 100 is at the hub.

While most lines 111 are preferably wire-connected directly to the IPCO 100, others are not. In this case, the lines 111 may be connected to the IPCO 100 indirectly through a remote terminal device (not shown). The remote terminal device provides several functions for the lines 111. For instance, voice channels on the lines 111 may be brought back to the IPCO 100 by the remote terminal device using a TDM transmission facility. Preferably, the switching function is still done at the IPCO 100, however. Alternatively, in remote areas, microwave transmission may be used to link the remote terminal device to the IPCO 100.

The trunks 115 are shared network facilities that are used to interconnect COs, a CO to a Private Branch Exchange ("PBX"), a CO to an IXC, or a CO to a data network, such as an Internet Service Provider ("ISP"). When a trunk goes active (i.e., is seized), additional information is ordinarily communicated to identify the current user. The general topology for CO-to-CO trunking is usually in the form of a physical star, with each CO logically connected to all other COs within the same Local Access and Transport Area ("LATA"). The ratio of lines 111 to trunks 115 is preferably, but not necessarily, 10:1. In other words, if the IPCO 100 had 50,000 lines 111, then the IPCO 100 would preferably also have about 5,000 trunks 115 interconnecting with other entities.

The broadband service lines 114 may include Integrated Services Digital Network ("ISDN") service lines 114a, such as Basic Rate ISDN ("BRI"), Digital Subscriber Line ("DSL")<service lines 114b, Asymmetric Digital Subscriber Line ("ADSL") service lines 114c, or a combination thereof. These broadband service lines may be connected to the IP telephony system 130 through one or more splitters 118. The splitter 118 is used to route incoming telephony frequencies to the CO switch 120, while permitting incoming frequencies containing IP data to pass onto the IP telephony system 130. Preferably, the splitter 118 is used to split up incoming frequencies from ASDL lines 114c.

Figure 3:
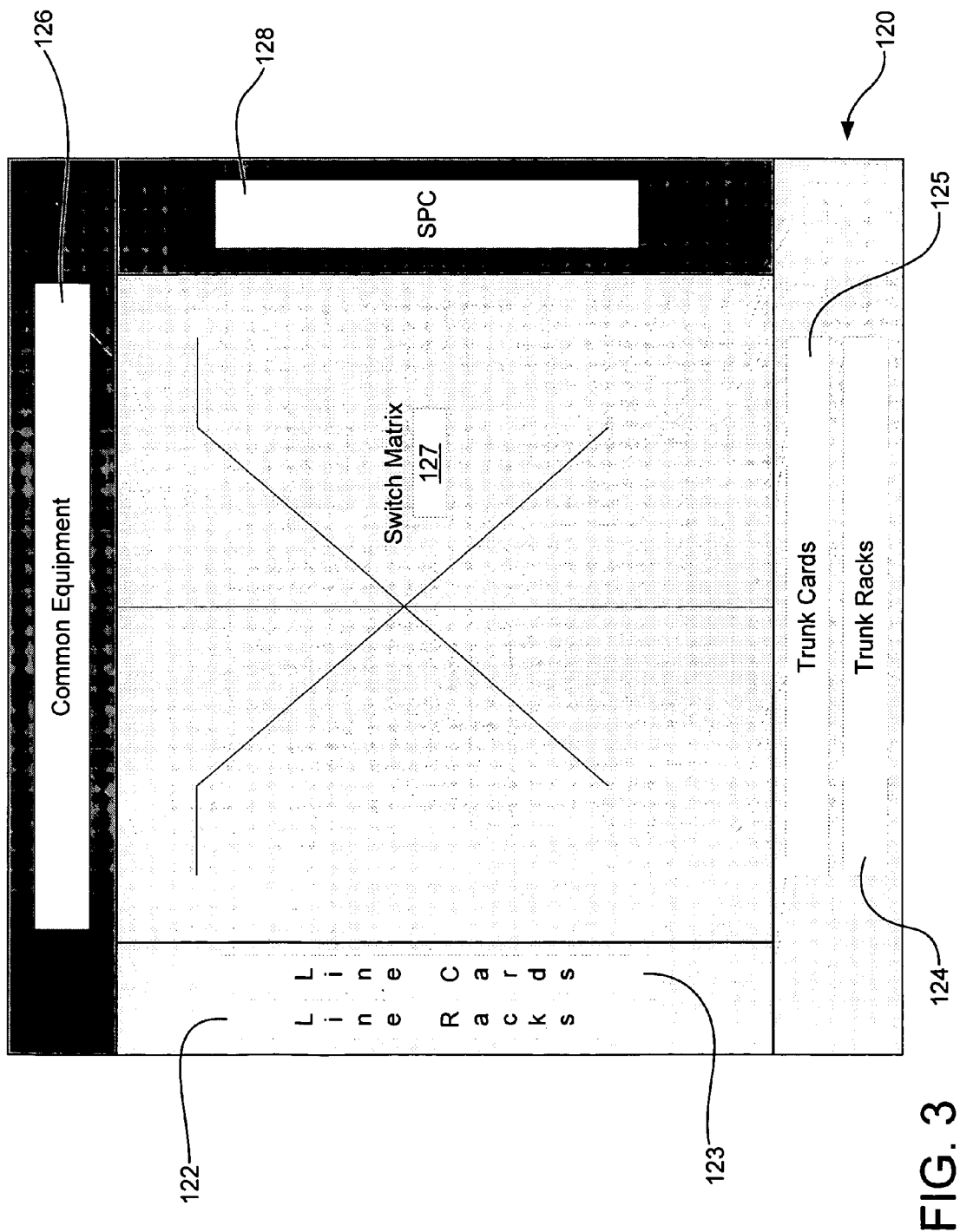
FIG. 3 is a block diagram illustrating a CO switch for the IPCO of FIG. 2.

As best shown in FIG. 3, the CO switch 120 is preferably composed of six distinct parts including line racks 122, trunk racks 124, common equipment 126, a switch matrix 127, a stored program control ("SPC") 128, and maintenance and administration (not shown). The line racks 122 contain line cards 123 that are used to terminate individual subscriber lines 111 and provide several different functions. These functions include battery power for the local loop current (i.e., normally −48 Volts) and overload protection against the 2000V metallic transient caused by a lightning strike, as well as protection against 440VAC power crosses. These functions also include ring voltage generation (i.e., 20 Hz, 100 $V_{rms}$, 2 seconds on/4 seconds off), supervision (i.e., detection of on-hook/off-hook conditions), and coding, such as analog-to-digital ("A/D") and digital-to-analog ("D/A") conversions at 8000, 8-bit samples per second, and $\mu$-law companding for North America to compress the dynamic range of the voice signal. Additional functions provided by the line cards involve hybrid circuitry, which provides 2 wire (loop) to 4 wire (switch) conversion, thereby separating the transmitted and received signals on the loop, and testing capability for in-circuit line connectivity. Collectively, the functions provided by the line cards are know by the acronym "BORSCHT," with the "B" representing the battery power function, the "O" representing the overload protection function, the "R" representing the ring function, the "S" representing the supervision function, the "C" representing the coding function, the "H" representing the hybrid circuitry function, and the "T" representing the testing function.

Similarly, the trunk racks 124 have trunk cards 125 to terminate analog and digital trunks 115. The trunk cards 125 perform similar functions for the trunks 115 that the line cards 123 perform for the lines 111 (i.e., the BORSCHT functions). Although not shown, the common equipment 126 comprises shared switch resources, such as tone generators, tone receivers, and recorded announcements. In addition, the switch matrix 127 provides the interconnect mechanism for passing traffic between the line racks, trunk racks, and common equipment, and the SPC 128 provides a processor cluster for the CO switch 120 that contains redundant dedicated call processors, as well as maintenance and administrative processors. Also, the maintenance and administration portion (not shown) of the CO switch 120 encompasses automatic line testing and off-line diagnostic equipment.

Besides the MDF 110, the CO switch 120 is connected through its switch matrix 127 to the PSTN 129 and the IP telephony system 130, and is also connected to an SS7 network 131. Preferably, the CO switch 120 uses a customer's Dual Tone Multi-Frequency ("DTMF") input and dialed digits to differentiate between service for the PSTN 129 and the IP telephony system 130. The SS7 network 131, however, uses SS7, which is a packet-switched protocol that fits well into the Open Systems Interconnection ("OSI") seven-layer model, and contains functions that are roughly analogous to various functions of a Transmission Control Protocol ("TCP")/IP stack. The SS7 network 131 relies on SS7 to perform call setup, management and teardown, database services, and supplementary services, such as call forwarding, caller ID, and ringback. The SS7 network 131 preferably has three types of nodes: (1) service switching points ("SSPs"); (2) service transfer points ("STPs"); and (3) service control points ("SCPs"). Although not shown, SSPs are SS7 switches in the IPCO 100 that are connected to the CO switch 120 for ingress and egress access to the SS7 network 131. In addition, STPs are packet switches that forward and route SS7 messages within the SS7 network 131, and connect SSPs with other SSPs, as well as with SCPs. SCPs are distributed telephony databases that contain customer profiles, E.164 mappings, and call record information.

The SS7 network may be used for database lookup of 800 and 900 numbers. For example, when an IPCO 100 customer dials an 800 number, one of the SSPs of the SS7 network 131 sends a query through one or more STPs to one or more SCPs, which map that number into a distinct, locally specific E. 164 number. This "physical" number is then sent back to the CO switch 120 via the SS7 network 131, and the CO switch 120 completes the call. As a result, the E.164 mappings of the SS7 network 131 allow user-transparent, location-independent provisioning of free and toll services, and local number portability.

Turning now to the IP telephony system 130, the IP router 140 is used for routing IP packets within the IP telephony system 130 based on the information in their IP headers. IP headers contain routing information, such as destination IP addresses, and are well known in the art. As referred to in the present application, IP packets are digital data packets containing IP headers. Although only one IP router 140 is shown in FIG. 2, it should be understood that any number of IP routers may be used to route IP packets within the IP telephony system 130, depending on the amount of IP traffic, as well as administrative, manufacturing, and consumer preferences.

The IP router 140 may be connected to a number of different IP networks, including an IP data network 141, an IP voice network 142, a cable network 143, an IP backhaul for a wireless network 144, and an enterprise network 145, such as a PBX with leased lines. Also, data and voice packets may be differentiated by the IP router 140 for routing to the appropriate network (i.e., the IP data network 141 or the IP voice network 142) through a number of known ways, including, but not limited to, tunneling, Multi-Protocol Label Switching ("MPLS"), policy based routing, and use of the IP TOS byte. The IP router 140 is connected to the CO switch 120 through both the ITG 150 and the modem RAS 160.

The ITG 150 is also connected to the IP router 140, and is additionally connected to the CO switch 120. The ITG 150 is used as a converter between the CO switch 120 and the IP router 140 for real-time data, such as analog voice calls or video signals. Specifically, the ITG 150 is used to convert analog voice calls or video signals (i.e., the real-time data) from the CO switch 120 into Real Time Protocol ("RTP") IP packets for the IP router 140, and to convert RTP IP packets from the IP router 140 into analog voice calls or video signals (i.e., the real-time data) for the CO switch 120. For more information on RTP, see RFC-1889, specifically incorporated herein by reference.

Similarly, the modem RAS 160 is connected to both the CO switch 120 and the IP router 140. The modem RAS 160 is used as a converter between the CO switch 120 and the IP router 140 for modem calls. Specifically, the modem RAS 160 is used to convert analog modem calls from the CO switch 120 into digital IP packets for the IP router 140, and to convert digital IP packets from the IP router 140 into analog modem calls for the CO switch 120.

As shown in FIG. 2, the DSLAM 170 is also connected to the IP router 140, as well as the splitter 118. The DSLAM 170 is used to digitize transmissions from the broadband service lines 114 passing through the splitter 118. In other words, the DSLAM 170 creates IP packets for the IP router 140 from incoming transmissions of the broadband service lines 114.

The SG 180 is connected to the both IP router 140 and the SS7 network 131. Preferably, the SG 180 uses in-band signaling protocols, including IP signaling protocols, for signaling the IP telephony system 230, as well as the out-of-band SS7. Suitable examples of in-band signaling protocols include H.323 and Session Initiation Protocol ("SIP"). For more information on H.323, see International Telecommunications Union ("ITU") Recommendation H.323, specifically incorporated herein by reference, and for more information on SIP, see RFC-2543, specifically incorporated herein by reference. Preferably, the SG 180 has the ability to translate between SS7 and in-band signaling protocols, such as IP signaling protocols (i.e., H.323 and SIP), so that, to the end user, signaling is transparent. For example, the cable network 143 may use Media Gateway Control Protocol ("MGCP") for signaling to a user's set top box, but perhaps use SIP to pass signaling information on to the SG 180. Like the CO switch 120, the SG 180 may also use SS7 for 800 and 900 number database lookups, but perhaps use H.323 to signal remote IPCOs.

The SG 180 may include a Media Controller ("MC") 180a. The MC 180a performs the signaling functions, maintains state, and retains most of the intelligence of the SG 180. As specified in well known gateway controller protocols, such as MGCP, the MC 180a may also control a Media Gateway ("MG") 180b by using a small number of simple primitive operations and commands. The MG 180b may be embedded in the ITG 150, as shown in FIG. 2, or another device, such as the modem RAS 160. These gateway controller protocols also specify how the MC 180a can use SS7 to map local access to a port in the MG 180b through the CO switch 120.

In contrast, the MG 180b performs the media functions and is designed to be as simple as possible. As a result, the MG 180b may be placed on a user's premises, i.e., within an IP telephone or other client device, rather than within the IPCO 100.

As shown in FIG. 2, the SG 180 is also connected to an Automated Message Accounting Teleprocessing Center ("AMATC") 190. The SG 180 records billing and call information from both the IP telephony system 130 and the SS7 network 131. The SG 180 also transmits, preferably as a batch process, the billing and call information to the AMATC 190, which then generates a call detail record ("CDR") (not shown) for each call. Preferably, the CDR contains the calling and called party's numbers, the answer and disconnect time to a tenth-of-a-second granularity, the call rate information, the special services used, and the performance statistics.

CDRs may be transmitted to a Regional Accounting Office ("RAO") (not shown), which generates bills for ILECs, IXCs, and other CLECs. The CDR format is preferably standardized so that the RAO and its software can be designed and/or operated by a third party. Customers may be provided with a single bill for all telecommunications services, such as wire-line voice, paging, voice mail, and wireless voice, as well as Internet access, cable television, broadband data, and e-mail.

The CLEC centric IPCO 100 operates in the following manner. Similar to a legacy CO, calls from the lines 111 and the trunks 115 may be routed through the CO switch 120 to the PSTN 129 or to the IP telephony system 130. Voice calls or video signals may be routed to the ITG 150 for conversion into RTP IP packets, while analog modem calls may be routed to the modem RAS 160 for conversion into digital IP packets. These IP packets may then be sent to the IP router 140 for routing to the appropriate network, such as the IP data network 141, the IP voice network 142, the cable network 143, the wireless network 144, or the enterprise network 145.

Calls from the broadband service lines 114, such as the ADSL lines 114c, may be routed directly to the IP telephony system 130 through the splitter 118. After passing through the splitter 118, to the extent necessary, these calls are then digitized by the DSLAM 170 into IP packets and sent to the IP router 140. Like the incoming IP packets from the ITG 150 and the modem RAS 160, the incoming IP packets from the DSLAM 170 are forwarded by the IP router 140 to the appropriate network. Alternatively, the IP packets from the DSLAM 170 may be sent by the IP router 140 to the modem RAS 160 for conversion into analog modem calls and forwarding to the PSTN 129 through the CO switch 120.

IP packets from either the IP data network 141, the IP voice network 142, the cable network 143, the wireless network 144, or the enterprise network 145 may be sent to the IP router 140 for forwarding to one of the other networks. For example, IP packets may be sent from the IP voice network 142 to the IP router 140, and then forwarded by the IP router 140 onto the enterprise network 145. In this manner, calls in the form of IP packets from any of the networks may be sent within the IP telephony system 130 to another network without having to pass through the CO switch 120. As a result, the CLEC that provided, controlled, and operated the IP telephony system 130 is capable of independently completing calls without relying on the CO switch 120, which is usually provided, controlled, and operated by an ILEC.

IP packets from either the IP data network 141, the IP voice network 142, the cable network 143, the wireless network 144, or the enterprise network 145 may be sent to the IP router 140, however, for forwarding to the PSTN 129. In this case, the IP router 140 sends IP packets containing voice or video to the ITG 150 for conversion into voice calls or video signals and forwarding to the PSTN 129 through the CO switch 120. For instance, IP voice packets from the wireless network 144 may be sent by the IP router 140 to the ITG 150 for conversion into a voice call and forwarding to the PSTN 129 through the CO switch 120. For IP packets containing digital data, the IP router 140 sends the IP packets to the modem RAS 160 for conversion into analog modem calls and forwarding to the PSTN 129 through the CO switch 120. For instance, IP data packets from the IP data network 141 may be sent by the IP router 140 to the modem RAS 160 for conversion into an analog modem call and forwarding to the PSTN 129 through the CO switch 120.

In order to further illustrate the operation of the CLEC centric IPCO 100, a few examples of telephony call flow scenarios will now be discussed. A first user on the cable network 143 places a voice call to a second user on the wireless network 144 using an analog phone plugged into a cable set top box on the first user's premises. The set top box coverts the analog voice call to RTP IP packets and forwards the RTP IP packets to the IP router 140. The IP router 140 then sends the RTP IP packets to the wireless network 144, which either converts the IP RTP packets back into a voice call and transmits the voice call to the second user, or sends the IP RTP packets to the second user for conversion back into a voice signal.

As another example, a first user or computer sends an analog modem call through modem lines 113 to a second user or computer on the IP data network 141. The analog modem call is sent through the MDF 110 to the CO switch 120, which then forwards the analog modem call to the modem RAS 160. The modem RAS 160 converts the analog modem call to digital IP packets, and then forwards the IP packets to the IP router 140. Finally, the IP router 140 routes the IP packets to the IP data network 141 for delivery to the second user or computer.

In yet another example, a first user sends a voice call to a second user on the PSTN 129 and an analog modem call to a third user on the cable network 143 through ADSL lines 114c. The voice call is separated from the analog modem call and routed to the CO switch 120 by the splitter 118. The voice call is then forwarded to the PSTN 129 by the CO switch 120. On the other hand, the analog modem call is passed through the splitter 118 to the DSLAM 170, which digitizes the modem call and converts it into IP packets. The IP packets are then sent to the IP router 140 and forwarded by the IP router 140 to the cable network 143.

Figure 4:
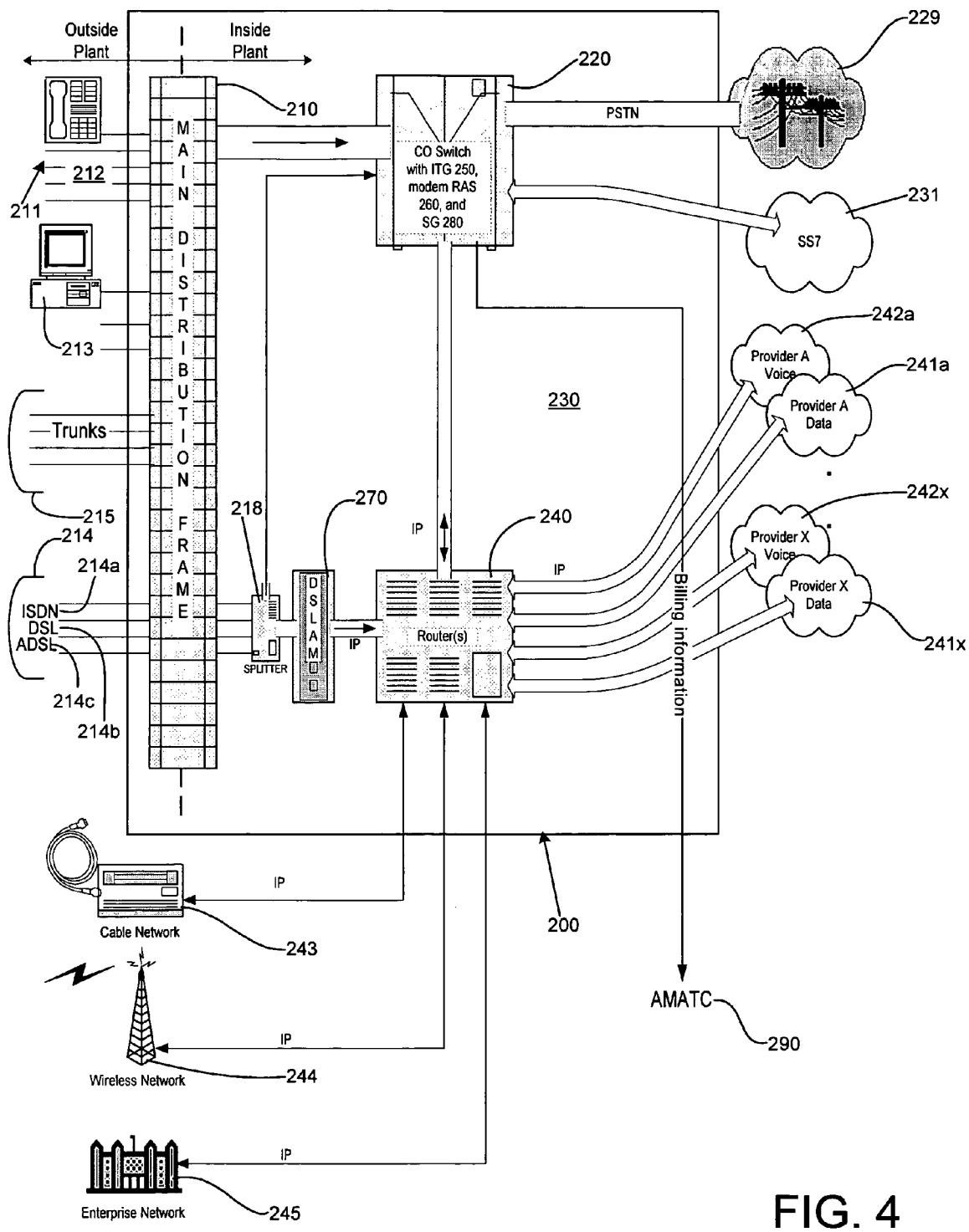
FIG. 4 is a block diagram illustrating an architecture for an ILEC centric IPCO of the present invention.

FIG. 4 shows an ILEC centric IPCO 200 of the present invention that also implements the general architecture of the IPCO 10 shown in FIG. 1. The ILEC centric IPCO 200 shown in FIG. 4 is identical to, and operates in the same manner as, the CLEC centric IPCO 100 shown in FIGS. 2–3, with only a few exceptions. To avoid redundancy and unnecessary repetition, only the differences between the two IPCOs will be discussed in detail below. For sake of clarity, the components of the ILEC centric IPCO 200 shown in FIG. 4 will be referenced by numerals in the 200s that correspond to similar or identical components of the CLEC centric IPCO 100 in the 100s. For instance, the MDF 210 of the ILEC centric IPCO 200 is identical to the MDF 110 of the CLEC centric IPCO 100. In addition, it should be understood that the 200 level components of the ILEC centric IPCO 200 are identical to their corresponding 100 level components of the CLEC centric IPCO 100, with the only differences being specifically noted below.

The primary difference between the two IPCOs is that in the embodiment shown in FIG. 4, the IP telephony system 230 is preferably provided, controlled, and operated, either directly or indirectly, by an ILEC, rather than one or more CLECs. As a result, many of the components of the IP telephony system 230, namely the ITG 250, the modem RAS 260, and the SG 280, may be combined and included within the CO switch 220, as shown in FIG. 4. Preferably, the ITG 250 and the modem RAS 260 are connected to the switch matrix 227 of the CO switch 220, while the SG 280 is connected to the ITG 250 and the modem RAS 260, as well as the SS7 network 231.

In this arrangement, the CO switch 220, and preferably its switch matrix 227, is connected directly to the IP router 240, with only IP packets being routed between the CO switch 220 and the IP router 240.

The ILEC centric IPCO 200 operates in the same manner as the CLEC centric IPCO 100. Although the IPCO 200 is preferably provided, controlled, and operated by an ILEC, however, the CLECs, such as IXCs, will still need to connect to the CO switch 220 and the IP telephony system 230 of the IPCO 200. As shown in FIG. 4, these CLECs are preferably connected to the IP router 240, and represented as providers of data 241a, 241x and voice 242a, 242x, where x is any desirable number of providers. As a result of this arrangement, the multiple providers of data and voice can access both the CO switch 220 and the IP telephony system 230 of the IPCO 200 through the IP router 240. IP packets are routed to and from the multiple providers of data and voice 241a, 241x, 242a, 242x in the same manner that IP packets are routed to and from the IP data network 141 and the IP voice network 142 of the IPCO 100.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A telephony system comprising:
   a switch connected to a first network;
   a router for routing Internet Protocol packets, the router being connected to a second network using Internet Protocol addressing; and
   a telephony gateway for converting voice signals into Internet Protocol packets and for converting Internet Protocol packets into voice signals, the telephony gateway being connected to both the switch and the router;
   wherein the switch differentiates between voice signals and data signals, and routes voice signals to the telephony gateway.

2. The telephony system of claim 1 wherein the first network is the Public Switched Telephone Network.

3. The telephony system of claim 1 wherein the voice signals are voice calls.

4. The telephony system of claim 1 wherein the telephony gateway also converts the voice signals into Real Time Protocol packets.

5. The telephony system of claim 1 wherein the switch includes line cards connected to a switch matrix.

6. The telephony system of claim 5 wherein the switch further includes trunk cards connected to the switch matrix.

7. The telephony system of claim 1 further comprising a signaling gateway connected to the router, the signaling gateway using an in-band signaling protocol for signaling the telephony gateway through the router.

8. The telephony system of claim 7 wherein the signaling gateway is also connected to an out-of-band signaling network, the signaling gateway having a translator for translating in-band signaling to out-of-band signaling and for translating out-of-band signaling to in-band signaling.

9. The telephony system of claim 1 wherein the second network is a voice network.

10. The telephony system of claim 1 further comprising a remote access server for converting data signals into Internet Protocol packets and for converting Internet Protocol packets into data signals, the remote access server being connected to both the switch and the router, wherein the switch routes data signals to the remote access server.

11. The telephony system of claim 1 wherein the switch is controlled by an Incumbent Local Exchange Carrier, and the telephony gateway and the router are controlled by a Competitive Local Exchange Carrier.

12. The telephony system of claim 1 wherein the switch, the telephony gateway, and the router are controlled by an Incumbent Local Exchange Carrier.

13. A telephony system comprising:
    a switch connected to a first network;
    a router for routing Internet Protocol packets, the router being connected to a second network using Internet Protocol addressing; and
    a remote access server for converting data signals into Internet Protocol packets and for converting Internet Protocol packets into data signals, the remote access server being connected to both the switch and the router;
    wherein the switch differentiates between voice signals and data signals, and routes data signals to the remote access server.

14. The telephony system of claim 13 wherein the first network is the Public Switched Telephone Network.

15. The telephony system of claim 13 wherein the data signals are modem calls.

16. The telephony system of claim 13 wherein the switch includes line cards connected to a switch matrix.

17. The telephony system of claim 16 wherein the switch further includes trunk cards connected to the switch matrix.

18. The telephony system of claim 13 further comprising a signaling gateway connected to the router, the signaling gateway using an in-band signaling protocol for signaling the remote access server through the router.

19. The telephony system of claim 18 wherein the signaling gateway is also connected to an out-of-band signaling network, the signaling gateway having a translator for translating in-band signaling to out-of-band signaling and for translating out-of-band signaling to in-band signaling.

20. The telephony system of claim 13 wherein the second network is a data network.

21. The telephony system of claim 13 further comprising a telephony gateway for converting voice signals into Internet Protocol packets and for converting Internet Protocol packets into voice signals, the telephony gateway being connected to both the switch and the router, wherein the switch routes voice signals to the telephony gateway.

22. The telephony system of claim 13 wherein the switch is controlled by an Incumbent Local Exchange Carrier, and the remote access sever and the router are controlled by a Competitive Local Exchange Carrier.

23. The telephony system of claim 13 wherein the switch, the remote access server, and the router are controlled by an Incumbent Local Exchange Carrier.

24. A telephony system comprising:
    a switch for voice and data signals, the switch being connected to a first network;
    a router for routing Internet Protocol packets, the router being connected to a second network using Internet Protocol addressing;
    a telephony gateway for converting voice signals into Internet Protocol packets and for converting Internet Protocol packets into voice signals, the telephony gateway being connected to both the switch and the router; and
    a remote access server for converting data signals into Internet Protocol packets and for converting Internet Protocol packets into data signals, the remote access server being connected to both the switch and the router;
    wherein the switch differentiates between voice signals and data signals, routes voice signals to the telephony gateway, and routes data signals to the remote access server.

25. The telephony system of claim 24 wherein the first network is the Public Switched Telephone Network.

26. The telephony system of claim 24 further comprising a signaling gateway connected to the router, the signaling gateway using an in-band signaling protocol for signaling one of the telephony gateway and the remote access server through the router.

27. The telephony system of claim 26 wherein the signaling gateway is also connected to an out-of-band signaling network, the signaling gateway having a translator for translating in-band signaling to out-of-band signaling and for translating out-of-band signaling to in-band signaling.

28. The telephony system of claim 24 wherein the at least one network is one of a data network and a voice network.

29. The telephony system of claim 24 wherein the switch is controlled by an Incumbent Local Exchange Carrier, and the router, the telephony gateway, and the remote access server are controlled by a Competitive Local Exchange Carrier.

30. The telephony system of claim 24 wherein the switch, the router, the telephony gateway, and the remote access server are controlled by an Incumbent Local Exchange Carrier.

31. A switch for a telephony system comprising:
    a switch matrix capable of being connected to the Public Switched Telephone Network and an Internet Protocol network;
    at least one line rack with a plurality of line cards connected to the switch matrix;
    at least one trunk rack with a plurality of trunk cards connected to the switch matrix; and
    a telephony gateway for converting voice signals into Internet Protocol packets and for converting Internet Protocol packets into voice signals, the telephony gateway being connected to the switch matrix;
    wherein the switch matrix differentiates between voice signals and data signals, and routes voice signals to the telephony gateway.

32. The switch of claim 31 further comprising a remote access server for converting data signals into Internet Protocol packets and for converting Internet Protocol packets into data signals, the remote access server being connected to the switch matrix, wherein the switch matrix routes data signals to the remote access server.

33. The switch of claim 32 further comprising a signaling gateway connected to the telephony gateway and the remote access server, the signaling gateway using an in-band signaling protocol for signaling the telephony gateway and the remote access server.

34. The switch of claim 33 wherein the signaling gateway is also capable of being connected to an out-of-band signaling network, and the signaling gateway has a translator for translating in-band signaling to out-of-band signaling and for translating out-of-band signaling to in-band signaling.

35. The switch of claim 31 further comprising a signaling gateway connected to the telephony gateway, the signaling gateway using an in-band signaling protocol for signaling the telephony gateway.

36. A method of transferring information within a telephony system comprising the steps of:
    sending a circuit-switched signal to a switch connected to a first network;
    sending the circuit-switched signal from the switch to a telephony gateway connected to the switch if the circuit-switched signal is a voice signal, or to a remote access server connected to the switch if the circuit-switched signal is a data signal;
    converting the circuit-switched signal into an Internet Protocol packet at one of the telephony gateway and the remote access server;
    sending the Internet Protocol packet from one of the telephony gateway and the remote access server to a router connected to one of the telephony gateway and the remote access server; and
    routing the Internet Protocol packet from the router to a second network using Internet Protocol addressing connected to the router.

37. The method of claim 36 wherein the circuit-switched signal is a voice call, and further comprising the step of sending the voice call to the telephony gateway for conversion into the IP packet.

38. The method of claim 37 wherein the second network is a voice network.

39. The method of claim 36 wherein the circuit-switched signal is a modem call, and further comprising the step of sending the modem call to the remote access server for conversion into the IP packet.

40. The method of claim 39 wherein the second network is a data network.

41. The method of claim 36 further comprising the step of recording billing and call information at a signaling gateway connected to the router.

42. The method of claim 36 wherein the first network is the Public Switched Telephone Network.

43. A method of transferring information within a telephony system comprising the steps of:
    sending an Internet Protocol packet from a first network using Internet Protocol addressing to a router connected to the first network;
    sending the Internet Protocol packet from the router to a telephony gateway connected to the router if the Internet Protocol packet contains a voice signal, or a remote access server connected to the router if the Internet Protocol packet contains a data signal;
    converting the Internet Protocol packet to a circuit-switched signal at one of the telephony gateway and the remote access server;
    sending the circuit-switched signal from one of the telephony gateway and the remote access server to a switch connected to the one of the telephony gateway and the remote access server; and
    sending the circuit-switched signal from the switch to a second network connected to the switch.

44. The method of claim 43 wherein the circuit-switched signal is a voice call, and further comprising the step of sending the voice call to the telephony gateway for conversion into the IP packet.

45. The method of claim 44 wherein the first network is a voice network.

46. The method of claim 43 wherein the circuit-switched signal is a modem call, and further comprising the step of sending the modem call to the remote access server for conversion into the IP packet.

47. The method of claim 46 wherein the first network is a data network.

48. The method of claim 43 further comprising the step of recording billing and call information at a signaling gateway connected to the router.

49. The method of claim 43 wherein the second network is the Public Switched Telephone Network.

* * * * *